Feb. 12, 1957    E. BRANDENBERGER    2,781,121
ARTICLE TRANSFERRING, LOADING AND UNLOADING DEVICE
Filed June 10, 1953    3 Sheets-Sheet 1
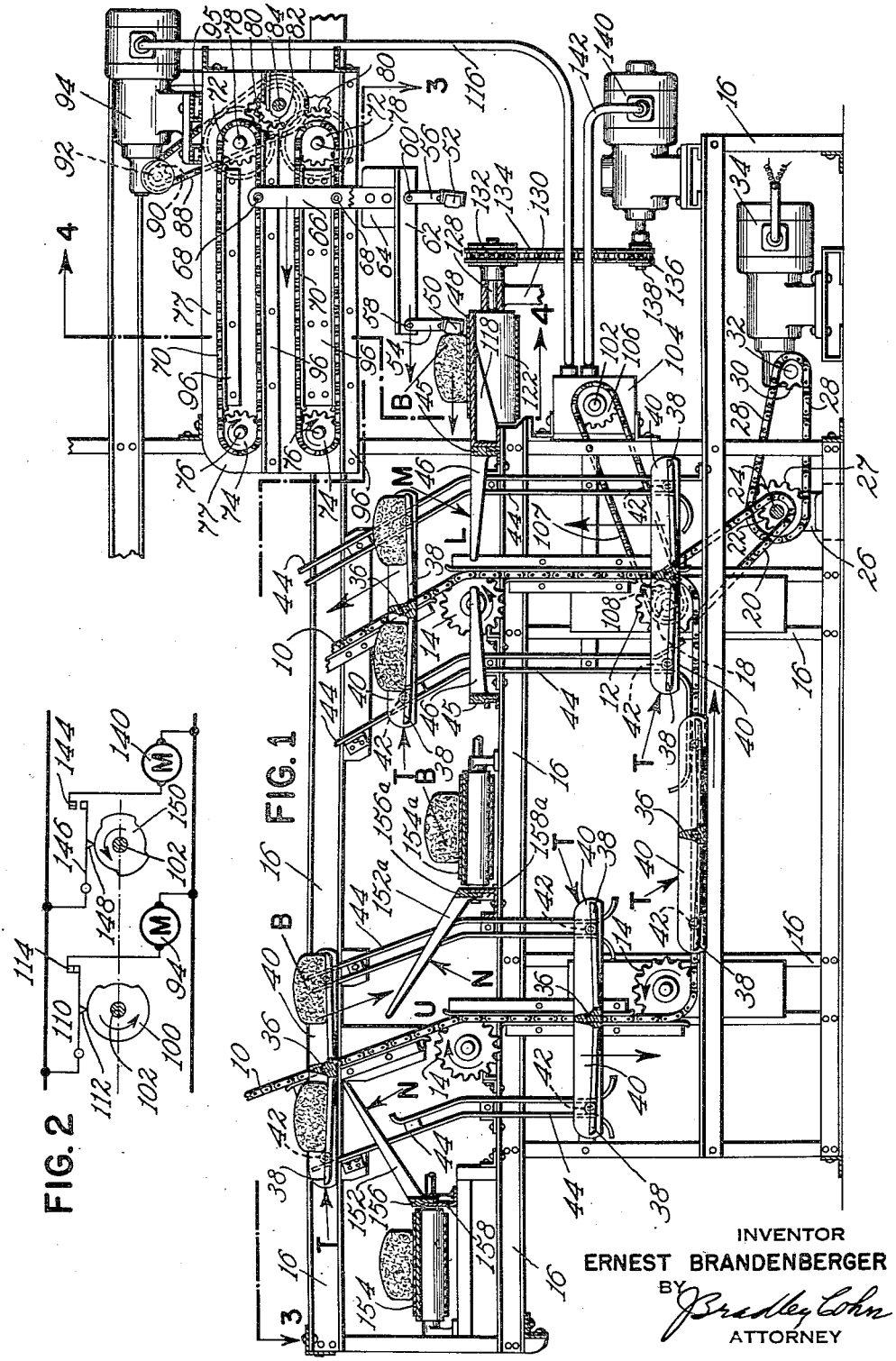
INVENTOR
ERNEST BRANDENBERGER
BY
Bradley Cohn
ATTORNEY

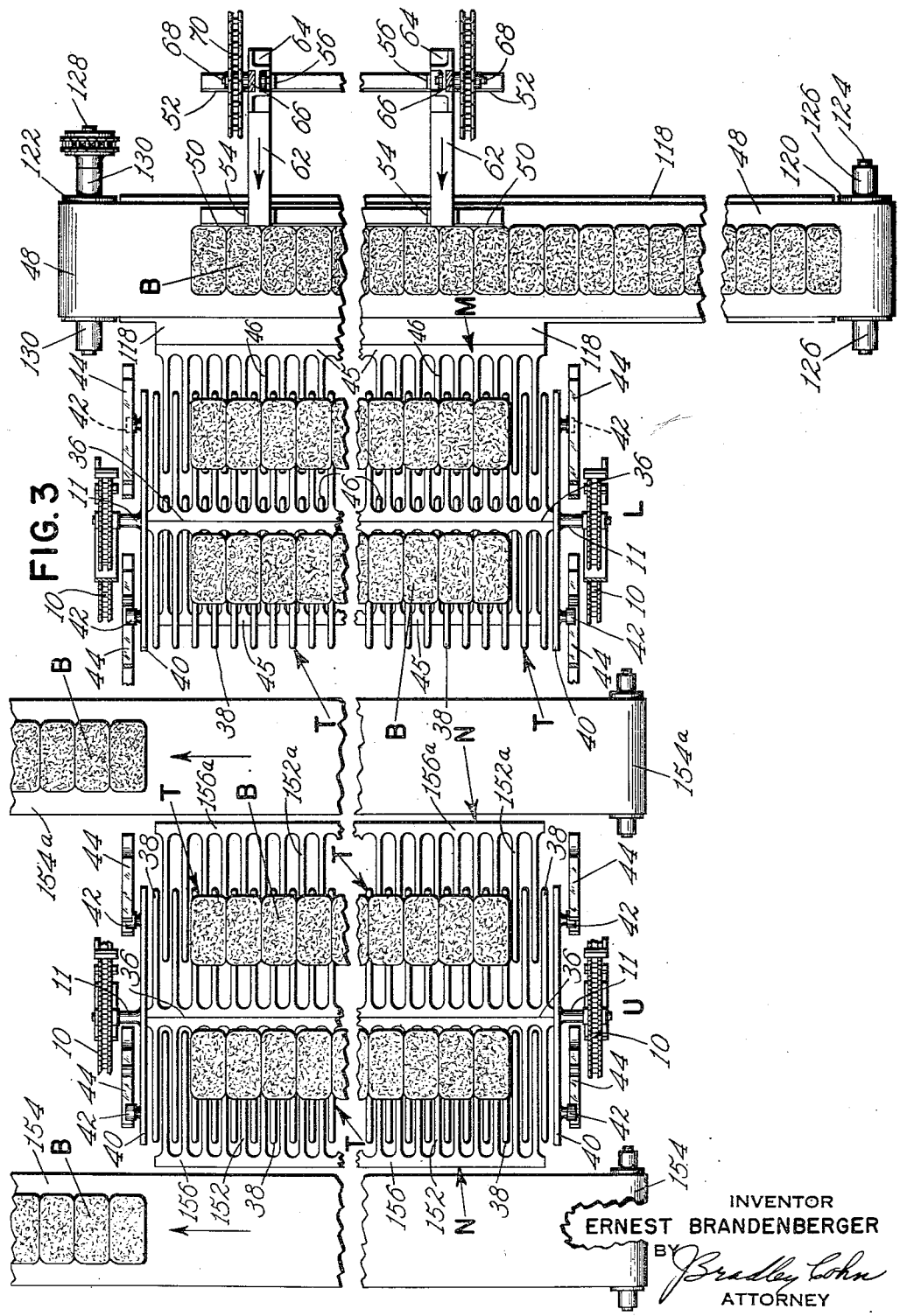

Feb. 12, 1957   E. BRANDENBERGER   2,781,121
ARTICLE TRANSFERRING, LOADING AND UNLOADING DEVICE
Filed June 10, 1953   3 Sheets-Sheet 3
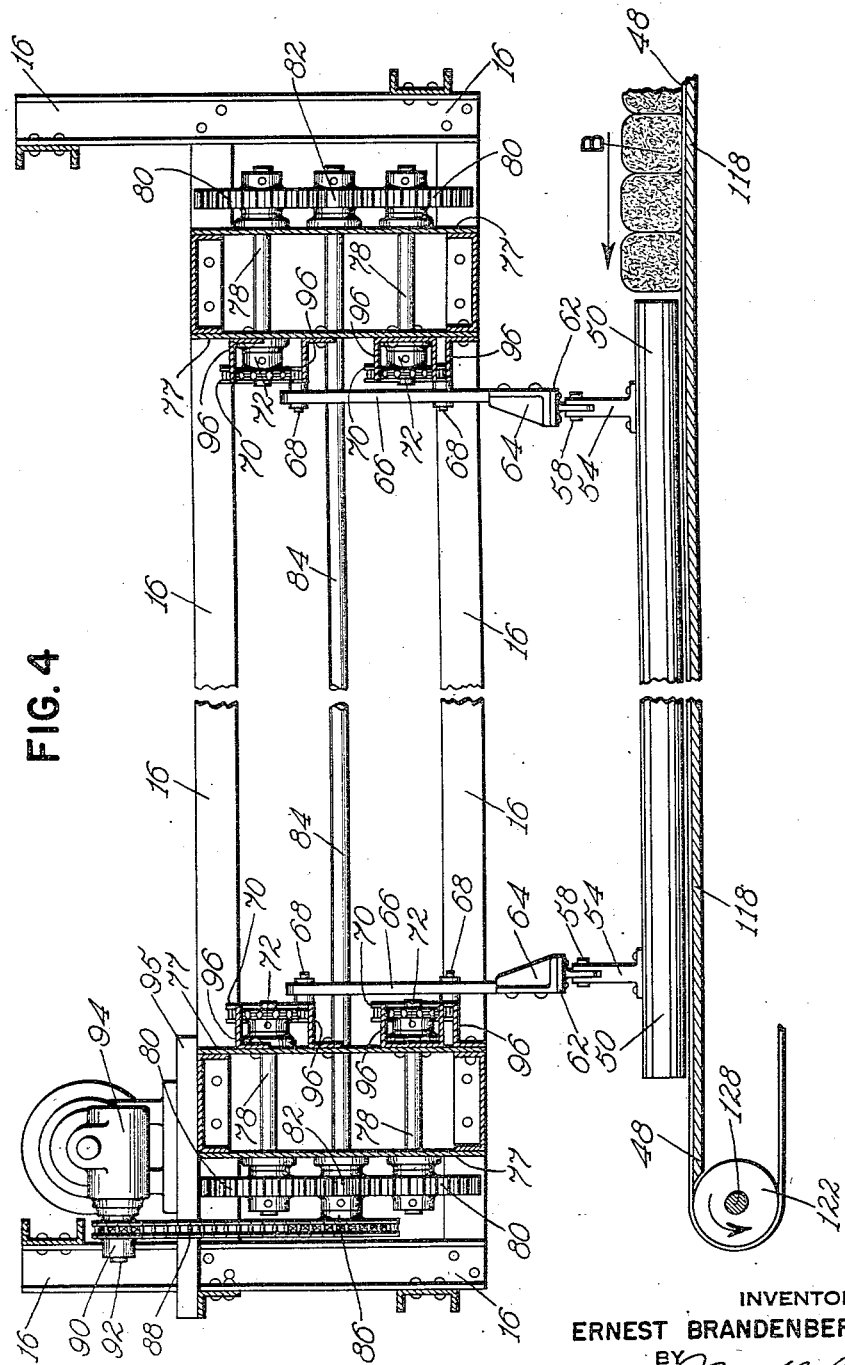
INVENTOR
ERNEST BRANDENBERGER
BY
ATTORNEY United States Patent Office 2,781,121
Patented Feb. 12, 1957

2,781,121

ARTICLE TRANSFERRING, LOADING AND UNLOADING DEVICE

Ernest Brandenberger, New Haven, Conn., assignor to American Machine & Foundry Company, a corporation of New Jersey Application June 10, 1953, Serial No. 360,665

9 Claims. (Cl. 198—31)

This invention relates to material handling, principally the handling of uniformly sized packages and other like articles, and more specifically to the loading and unloading of bread loaves on a conveyor mechanism.

In the bakery industry, in order to conserve space and accelerate handling, baked bread, as it issues hot from the oven, is passed through a cooling device to rapidly reduce its temperature. Such cooling devices generally consist of a conveyor mechanism which must be loaded and unloaded.

It is an object of this invention to devise a particular type of tray which may be used in conjunction with a conveyor and which may be readily and automatically loaded and unloaded.

It is a further object of this invention to provide a simplified means for loading and unloading loaves of bread onto trays of an endless conveyor.

Another object of the invention is to provide a mechanism for automatically and continuously transferring rows of articles from an endless belt conveyor, or like structure, to trays mounted on an endless conveyor and in timed relation therewith.

It is a further object of this invention to provide means for transferring such rows of articles to said trays without varying the motion of said trays and endless conveyor. By means of my novel arrangement, loaves of bread, or like articles, may be transferred to the trays of an endless conveyor while said endless conveyor is kept in constant motion.

It is likewise an object of my invention to remove said objects from the conveyor also without disturbing its motion.

Moreover, my invention will accomplish the above-mentioned objects without disturbing the continuity of the regular flow of the articles to the end that they may be continuously delivered without interruption. I employ a "double type" tray consisting of a transverse center bar having outwardly extending fingers to form the bottom of the tray. These fingers interdigitate with fingers of stationary platforms to load and unload the tray. I have devised a means in combination with a loading platform to load it continuously in proper timed relation so that rows of articles are placed thereon in time to be engaged by successive trays as they move continuously along an endless conveyor.

I have further devised means for conveniently automatically and continuously removing the articles from said trays.

In the accompanying drawings:

Fig. 1 is a sectional side elevation illustrating the loading and unloading device of an endless bread cooling conveyor system;

Fig. 2 is a wiring diagram of the electrical central device for synchronizing the bread infeed conveyor with the infeed pusher mechanism;

Fig. 3 is a plan view of the loading and unloading device, taken on line 3—3 of Fig. 1, and Fig. 4 is a sectional end elevation of the infeed pusher mechanism, taken on line 4—4 of Fig. 1.

With reference to the drawings, the loading and unloading devices are illustrated with an endless bread cooling conveyor which consists of a pair of endless chains 10 carrying a plurality of evenly spaced conveyor trays T attached by the pivots 11 to the chains 10. The conveyor chains 10 are driven by means of a pair of sprockets 12 and are guided over a plurality of pairs of properly arranged idler sprockets 14 rotatably supported by suitable studs on the frame structure 16 of the bread cooling apparatus which may be of any length or shape required.

Each driving sprocket 12 is mounted on a stud shaft 18 driven from another sprocket (not visible) by means of a chain 20 connected to a sprocket 22. Each sprocket 22 is mounted on a horizontal shaft 24 supported by bearing brackets 26. To shaft 24 is also secured a sprocket 27 which by means of a chain 28 is driven from a sprocket 30 mounted on drive shaft 32 of gear reduction motor 34.

The conveyor trays T consist of a transverse center bar 36 having a plurality of spaced fingers 38 extending outwardly from either side of said bar to form the bottom or platform of the tray. The side walls of the trays are formed by the plates 40 secured on each end of bar 36. The plates 40 carry spaced rollers 42 that engage guide tracks 44 to serve as guides and stabilizers for trays T as they pass through the cooling apparatus. All guide tracks 44 are conveniently secured to the frame structure 16 of the apparatus.

The trays T are automatically loaded (Fig. 1 and 3) as they pass upward through an interfingering loading platform M at loading station L. The loading platform M consists of two separate horizontally arranged members 45 each having a row of fingers or bars 46 spaced to interdigitate with spaced fingers 38 of conveyor trays T as they pass upwardly.

The loaves of bread B are delivered to the front end of loading platform M by means of an intermittently moving conveyor belt 48 which is timed to work in conjunction with a pair of spaced pusher bars 50 and 52 in the following manner.

Conveyor belt 48 intermittently travels a distance equal to the length of a row of loaves containing the desired number of loaves to be loaded onto each half of the loading platform. As soon as the loaf carrying belt stops the pusher bars 50 and 52 move forward in the direction of the arrow so that front pusher bar 50 contacts the row of loaves on the belt and moves them onto the first half of the loading platform. The pusher bars 50 and 52 are then stopped with bar 50 still in engagement with the row of loaves just transferred from the belt while the bar 52 comes to rest adjacent the right hand edge (Fig. 3) of feed belt 48. Belt 48 then advances another equal distance to place a new row of loaves between the two arrested pusher bars and opposite the loading platform. The two pusher bars then resume their forward motion causing bar 50 to move the first row of loaves onto the rear (left) half of loading platform M while bar 52 pushes the second row of loaves from belt 48 onto the front (right) half of platform M so that now the platform is loaded with two rows of loaves which are picked up by the next ascending conveyor tray T to be carried thereby through a provided cooling area. The pusher bars 50 and 52 ascend over the loaves on platform M at the end of their second stroke and retract to their original starting position as illustrated. This ascent results from continued motion of supporting bar 66 around the sprockets 74.

Each pusher bar 50 and 52 is provided with a pair of suitable arms or lugs 54 and 56 (Figs. 1 and 4), respectively, which by means of studs 58 and 60, respectively, are pivotally suspended from a pair of horizontal supporting members 62 secured to a bracket 64 mounted in a vertical supporting bar 66. The upper free end of each bar 66 is attached by studs 68 to a pair of horizontal endless chains 70 positioned parallel above each other. Each chain 70 is driven by a sprocket 72 at one end and led over an idler sprocket 74 at the other. The chains 70 are kept level and parallel to each other by a plurality of guide rails or tracks 96 secured to vertical members of frames 77.

The idler sprockets 74 are rotatably supported by means of stud shafts 76 (Fig. 1) held by a pair of suitable bearing support frames 77 secured to the frame structure 16 of the machine (Figs. 2 and 4).

Each driving sprocket 72 is mounted on a horizontal shaft 78. The shafts 78 are respectively supported in each of the two bearing support frames 77. Each shaft 78 has secured thereto a gear 80. Each gear 80 engages with another respective gear 82 both of which are mounted on a transverse horizontal shaft 84 (Fig. 4) supported by the two bearing support frames 77. Shaft 84 is driven by sprocket 86 which by means of a chain 88 is driven from a sprocket 90 keyed on a shaft 92 protruding from the housing of a suitable gear reduction motor 94. Motor 94 is mounted on a platform 95 secured to one of the bearing support frames 77 and the frame structure 16 of the machine.

The action of pusher bars 50 and 52 is controlled by the intermittent rotation of the gear reduction motor 94 which in turn is timed by means of a motor control cam 100 (Fig. 2) mounted on a shaft 102 supported by suitable bearings in a control box 104 (Fig. 1). A sprocket 106 is secured on the protruding end of shaft 102. Sprocket 102 is continuously driven by chain 107 from a sprocket 108 mounted on one of the continuously driven stud shafts 18 which drive tray conveyor chains 10.

Cam 100 controls the arm 110 (Fig. 2) stopping and starting of pusher operating motor 94 through the opening and closing of switch 114. The switch opens when cam follower 112 on arm 110 moves over a low portion of cam 100. The high portion of cam 100 closes the switch. Motor 94 is connected to the switch contacts 114 in box 104 by means of a cable 116 (Fig. 1). As mentioned heretofore, the motion of pusher bars 50 and 52 is in proper timed relation to the intermittent motion of infeed conveyor belt 48.

Conveyor belt 48 is supported by means of a table bracket 118 led over an idler roller 120 and driven by means of roller 122. The table bracket 118 is mounted on the frame structure 16 and is also secured to the front of the loading platform member 45. Idler roller 120 is loosely mounted on a shaft 124 supported by suitable bearing brackets 126. The driving roller is mounted on a shaft 128 also supported by a suitable bearing bracket 130.

Shaft 128 is driven from shaft 138 of gear reduction motor 140 through sprocket 136, chain 134 and sprocket 132 secured to the shaft 128. Motor 140 is connected to a switch contact 144 by means of a cable 142. Switch 144 is opened or closed by continuously driven shaft 102, cam 150, cam follower 148 and switch arm 146 as shown diagrammatically in Fig. 2. Switch 144 opens as cam follower 148 rides over the low portion of cam 150 and the infeed conveyor motor 140 stops. When the cam follower 148 rides over the high portion of cam 150 the contact is closed and motor 140 runs to move feed conveyor belt 48. Cam 150, switch arm 146 and contacts 144 are all mounted in control box 104 and cam 150 is secured on shaft 102 in proper relation to the other control cam 100 for proper synchronization between the loaf feeding and the pusher mechanism.

After the bread loaves are lifted from loading platforms 46 at loading station L by the conveyor trays T and carried through the cooling path, the two rows of loaves on each tray are discharged at the unloading station U in the following manner. Rollers 42 provided at each end of conveyor trays T contact and enter the guide tracks 44 to stabilize the trays. During the descent of the tray one row of loaves is first contact by a row of inclined and spaced stationary bars or fingers 152 and deflected onto a continuously moving transverse conveyor belt 154. This deflection of the loaves on the tray T is made possible by the inclined bars 152 during its downward motion. The inclination of bars 152 causes the row of loaves to slide laterally onto belt 154 after fingers 138 of the tray T completely passed bars 152. The second row of loaves is removed in like manner by spaced bars 152a onto a transverse conveyor belt 154a during the continued descent of tray T. Conveyors 154 and 154a are driven continuously from a suitable driving means (not shown). Inclined bars 152 and 152a project from a bar 156 and 156a, respectively, each of which is secured to a transverse member 158 and 158a, respectively, of frame structure 16. After the cooled loaves are taken off each tray T at unloading station U in the manner just described, the empty trays move to loading station L to repeat the cycle.

Unloading platform U may be pivotally mounted to move to the horizontal during passage of the tray therethrough and then pivot to the angular position to slide the row of loaves in conveyor 154 or 154a as the case may be. Such a structure provides a smoother delivery, since any loaves that may stick to trays T have been removed therefrom, so all may slide together onto the outfeed belt 154 or 154a.

I claim:

1. In a device for cooling loaves of bread, an endless conveyor comprising, a pair of parallel spaced endless chains, trays pivotally suspended between said chains, said trays having a center bar and fingers extending laterally from said center bar to form the bottom platform of said tray having a side on each side of said center bar, a loading platform constructed and arranged to interfinger with said bottom fingers of each side of said tray, an endless conveyor belt moving past said loading platform, drive means to drive said conveyor belt, a pusher mechanism constructed and arranged to push two separate rows of loaves of bread from said belt conveyor onto said loading platform one row at a position corresponding to one side of said interfingering tray and one row corresponding to said other side, control means to arrest said drive means to said endless conveyor belt and energize said pusher mechanism simultaneously just subsequent to the passage of one of said trays on said chain conveyor through said loading platform and prior to the arrival of the next subsequent tray.

2. In a cooling device for bread, a pair of spaced endless chains, trays pivotally supported by and between said chains, the bottoms of said trays being formed of outwardly extending finger-like spaced members secured to a central bar, a platform mounted to load said trays by interdigitating said finger-like members, said platform being formed with a central opening sufficiently large to permit passage therethrough of said central bar supporting the finger-like members of said tray, means moving from one side of said platform to load at least one row of articles on each side of said central opening of said platform, a second platform having a similar central opening formed therein and positioned to remove the rows of said articles loaded on said trays and being tilted to decline outwardly from said central bar of said trays to slide articles removed from said trays by said platform down and laterally from said tray, and control means operated by the drive means of said endless chain conveyor to regulate said loading means whereby articles will be placed on said platform just following passage of a tray therethrough and prior to the arrival of the next subsequent tray on said endless chains.

3. A tray loading mechanism for trays adapted to move upwardly through a loading platform by interfingering therewith comprising, an endless conveyor belt mounted adjacent the platform to convey a row of articles, a moving support mounted above said conveyor belt to move transversely thereto, at least two pusher bars mounted on said support, means to move said support across said conveyor belt so that the first of said pusher bars will convey one row of articles partway onto said platform, other means to advance said conveyor belt to bring a second row of articles in front of the next pusher bar, the first-named means then advancing said support with said first pusher means and said second pusher means to place at least two rows of articles on said loading platform, said movable support then moving upwardly and back to its initial position.

4. A tray loading mechanism adapted to load articles on trays, said trays comprising, a central support bar and laterally extending spaced fingers on each side of said support bar to form the bottom of said tray, a loading platform having complementary fingers to interdigitate with the fingers of said tray, said loading platform being formed of two elements supported at their ends and being open in the center to permit passage of the central bar of said tray, said trays being mounted to move upwardly through said loading platform, an endless conveyor belt mounted adjacent said loading platform, an endless chain mounted above and transverse said endless belt, a bracket secured to travel with said endless chain, two pusher bars secured to said bracket in tandem position relative to the direction of travel with said endless chain, means to intermittently drive said endless chain, other means to intermittently drive said endless conveyor belt, control means to operate said first-named means to move a row of articles on said endless conveyor belt to said loading platform, said control means then arresting said first-named means and energizing said other means to operate said endless conveyor belt a predetermined distance to transport a second row of articles to a position between said pusher bars, said control means then arresting said other means and energizing said first-named means to move said bracket with said pusher bars to transfer two rows of articles onto said platform on either side of the opening in said platform, said endless chain then moving said pusher bars up and backward to their initial position whereby one of said trays will pass upwardly through said loading platform to pick up said two rows of articles.

5. In an automatic bread cooling device, a combination of trays formed by a transverse center bar and laterally positioned horizontal fingers extending from said bar to support a row of loaves on each side of said bar, of a conveyor to which said trays are attached, a loading platform constructed of finger-like members positioned to interfinger with the fingers of said trays during an upward passage thereof along said conveyor, said loading platform having a central opening to permit passage of said central bar therethrough, said space being sufficiently small to permit a loaf to be pushed across from one side of said platform to the other, a pair of tandem pusher bars, the first of said pusher bars adapted to move a row of loaves of bread across said loading platform and across said space, the second of said pusher bars constructed and arranged to move a row of loaves onto said platform whereby said rows of loaves supported on said platform may be removed therefrom by a tray passing upward through said platform.

6. In an automatic bread cooling device, a combination of trays formed by a transverse center bar and laterally positioned horizontal fingers extending from said bar to support a row of loaves on each side of said bar, of a conveyor to which said trays are attached, a loading platform constructed of finger-like members positioned to interfinger with the fingers of said trays during an upward passage thereof along said conveyor, said loading platform having a central opening to permit passage of said central bar therethrough, a pair of tandem pusher bars, the first of said pusher bars adapted to move a row of loaves of bread across said space, the second of said pusher bars constructed and arranged to move a row of loaves onto said platform whereby said rows of loaves supported on said platform may be removed therefrom by a tray passing upward through said platform.

7. A combination article transfer device comprising, a horizontal endless belt whereon a row of articles are transported and a second conveyor comprising a pair of parallel spaced endless chains and trays pivotally supported by and between said chains, said trays comprising a longitudinal central bar pivoted at its ends to each of said chains respectively, transverse finger-like members forming the bottom of said tray and secured substantially at their midpoints to said longitudinal bar, a loading platform being formed of two substantially identical sections, each of said sections having a supporting member running transverse said chains and having finger-like projections secured to said supporting member extending toward said chains and positioned to interdigitate with the finger-like members of said trays moving with said chains, the free ends of the fingers of said sections of said loading platform approaching toward each other to a distance sufficiently large to permit passage of the longitudinal central bar of said trays, tandem pusher members spaced apart substantially half the width of said trays, said pusher bar being movable to transfer two rows of articles onto said platform whereby said trays moving with said chains may move upwardly through said platform and pick up said two rows of articles, one row on either side of said central bar.

8. A combination material transfer device characterized by elements substantially as set forth in claim 7 and further characterized by a control means whereby said pusher bars move said rows of articles onto said loading platform subsequent to the passage of one of said trays and prior to the arrival of the next of said trays.

9. A mechanism for feeding two rows of material sidewise from a single row moving on an endless belt comprising, the combination with the endless belt, of a pair of endless chains mounted adjacent and above one another in a single plane, a perpendicular bracket secured to one point each of said chains to move with said chains in a perpendicular position, said chains moving transverse to said endless conveyor, a pair of pusher bars secured to said bracket in tandem position to move transversely across said endless belt, control means to stop and start said belt and said endless chains, said control means energizing said endless belt to position a row of articles supported thereon in front of the first of said pushers, then arresting the movement of said belt and energizing said endless chain to move said pusher to slide sidewise said articles from said endless belt, said chains arresting their motion while said endless belt moves a second row of materials behind said first pusher and in front of said secondary pusher, said control means then moving said endless chains from said endless belt while the motion of said endless belt is arrested, said endless chains and said endless belts then moving to bring up the next row of material while said pushers rise around and retract with said endless chains to repeat the cycle.

References Cited in the file of this patent

UNITED STATES PATENTS

| | | |
|---|---|---|
| 1,140,110 | Buck | May 18, 1915 |
| 1,615,237 | Schwartz | Jan. 25, 1927 |
| 1,794,331 | Klyver et al. | Feb. 24, 1931 |
| 1,885,494 | Ulmann | Nov. 1, 1932 |
| 2,575,278 | Kearney | Nov. 13, 1951 |